Aug. 7, 1956  C. V. JOHNSON  2,757,621
CRUMBLE ATTACHMENT FOR PELLET MACHINES
Filed June 10, 1950  5 Sheets-Sheet 1

CLYDE V. JOHNSON
INVENTOR.

BY
Hazard & Miller
ATTORNEYS

Aug. 7, 1956   C. V. JOHNSON   2,757,621
CRUMBLE ATTACHMENT FOR PELLET MACHINES
Filed June 10, 1950   5 Sheets-Sheet 2

CLYDE V. JOHNSON
INVENTOR.

BY Hazard & Miller
ATTORNEYS

Aug. 7, 1956 — C. V. JOHNSON — 2,757,621
CRUMBLE ATTACHMENT FOR PELLET MACHINES
Filed June 10, 1950 — 5 Sheets-Sheet 3

CLYDE V. JOHNSON
INVENTOR.

BY
Hazard & Miller
ATTORNEYS

Aug. 7, 1956
C. V. JOHNSON
2,757,621
CRUMBLE ATTACHMENT FOR PELLET MACHINES
Filed June 10, 1950
5 Sheets-Sheet 4
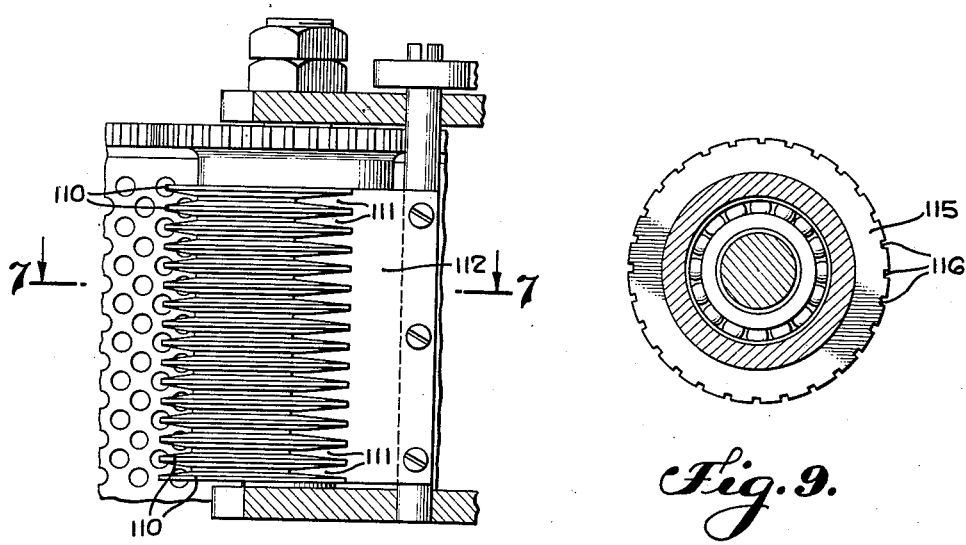
Fig.6.
Fig.9.
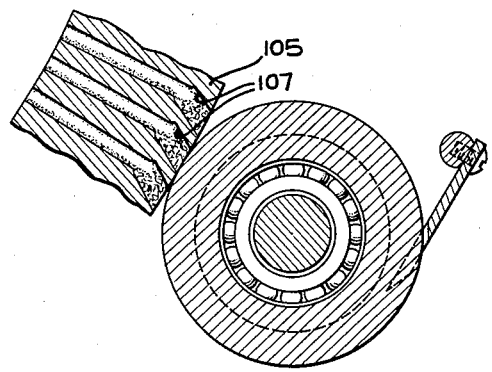
Fig.8.
Fig.7.
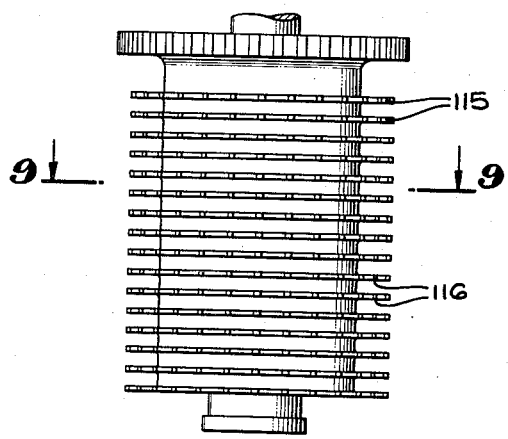
CLYDE V. JOHNSON
INVENTOR.
BY
Hazard & Miller
ATTORNEYS Aug. 7, 1956   C. V. JOHNSON   2,757,621
CRUMBLE ATTACHMENT FOR PELLET MACHINES
Filed June 10, 1950   5 Sheets-Sheet 5
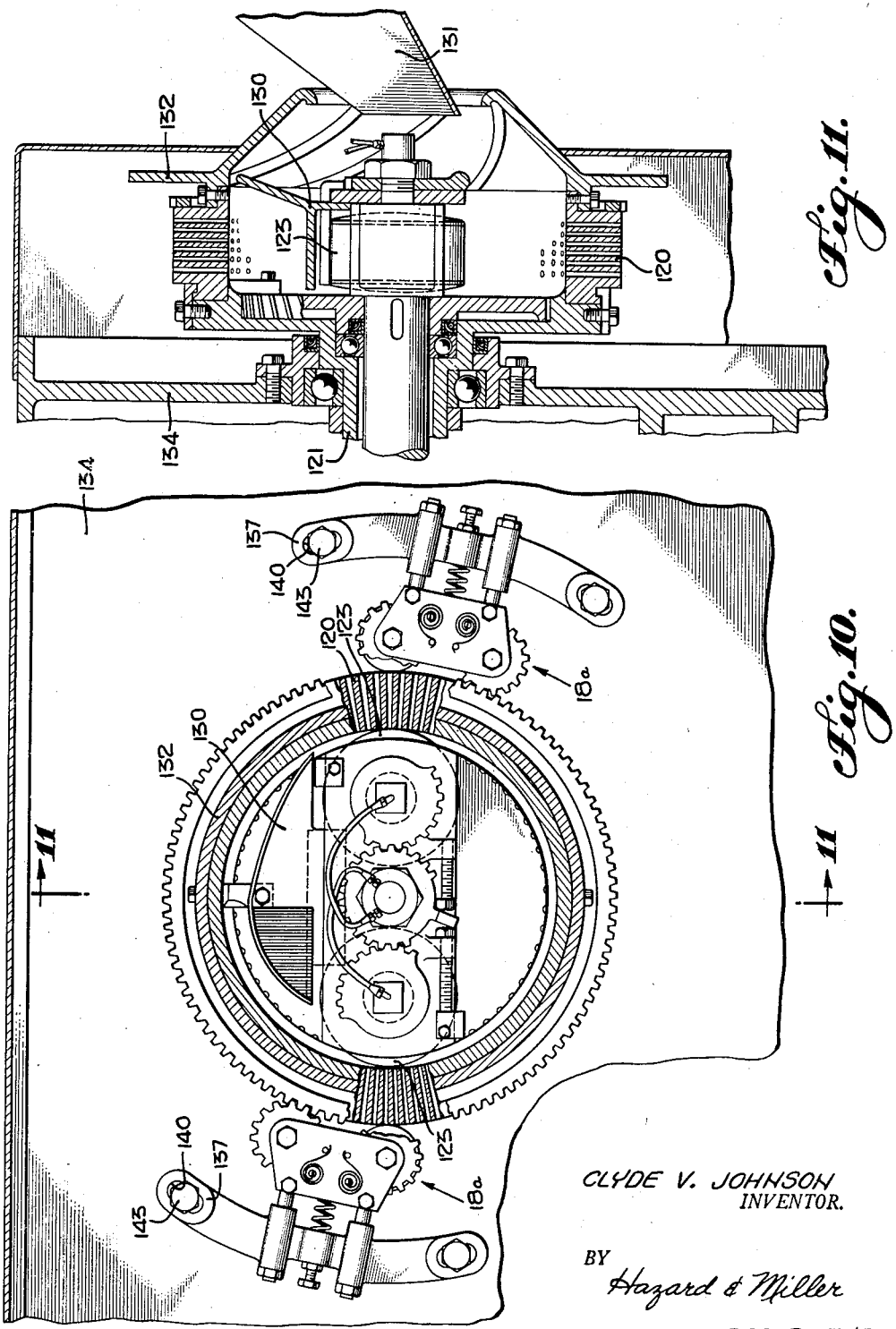
CLYDE V. JOHNSON
INVENTOR.
BY Hazard & Miller
ATTORNEYS

United States Patent Office 2,757,621
Patented Aug. 7, 1956

2,757,621

CRUMBLE ATTACHMENT FOR PELLET MACHINES

Clyde Vern Johnson, Los Angeles, Calif.

Application June 10, 1950, Serial No. 167,443

11 Claims. (Cl. 107—14)

This invention relates to apparatus for performing operations on moldable material for producing feeds and the like, and this application is a continuation-in-part of my copending applications Serial No. 18,598, filed April 2, 1948, now Patent No. 2,700,940, dated February 1, 1955, and Serial No. 153,680, filed April 3, 1950, now Patent No. 2,700,941, dated February 1, 1955.

In my prior applications a main object was to produce pellets from moldable material and to avoid crumbling of the material whereas in the present invention a main object is to produce the highest percentage of crumbling of the moldable material and to avoid producing pellets, spaghetti, and other non-crumbled shapes.

Poultry producers have discovered that in some instances their chickens consume more of crumbled material than of pellet material, and therefore, it is a main object of the present invention to provide apparatus for producing crumbled material.

The dry feed which is fed into a pellet-producing apparatus or a crumble-producing apparatus cannot be satisfactorily fed to poultry and other animals because the various constituents of the feed tend to stratify, settle out, and the feed becomes non-uniform and some of the valuable constituents are even blown away, and therefore the necessity of first mixing the dry feed with steam and producing a moldable mass and then producing from the moldable mass pellets or crumbles is appreciated.

In the present invention crumbling of the moldable mass is achieved in two main ways, one being forming the extruding orifices with unsupported portions thereof so that when the moldable material is forced into the unsupported portions the moldable material under ideal conditions will thoroughly crumble. However, ideal conditions are not always achieved and therefore, in the present invention a plurality of gangs of discs are provided to rotate over the centers of the outlets of the extruding orifices to insure a thorough crumbling of the moldable material.

Another object of the present invention is to provide a novel extruding die for the purpose of crumbling moldable material.

Another object of the present invention is to provide various improvements in crumble apparatus and particularly improvements in mounting the gangs of discs.

Another object of the present invention is to provide a novel manner of driving the gangs of discs and also a novel manner of cleaning the gangs of discs.

With the foregoing and other objects in view, which will be made manifest in the following detailed description and specifically pointed out in the appended claims, reference is had to the accompanying drawings for an illustrative embodiment of the invention, wherein:

Fig. 6 is a view similar to Fig. 4 showing disc construction of a type different from that disclosed in Fig. 4;

Fig. 7 is a sectional view along lines 7—7 of Fig. 6 showing a modified form of the extruding die;

Fig. 8 is a view of a modified form of a gang of discs;

Fig. 9 is a sectional view along lines 9—9 of Fig. 8;

Fig. 10 is a fragmentary plan view of a modified form of the invention wherein the annular die rotates and the extruding rollers and the crumble roller units remain bodily stationary; and Fig. 11 is a sectional view along lines 11—11 of Fig. 10.

Figure 1:
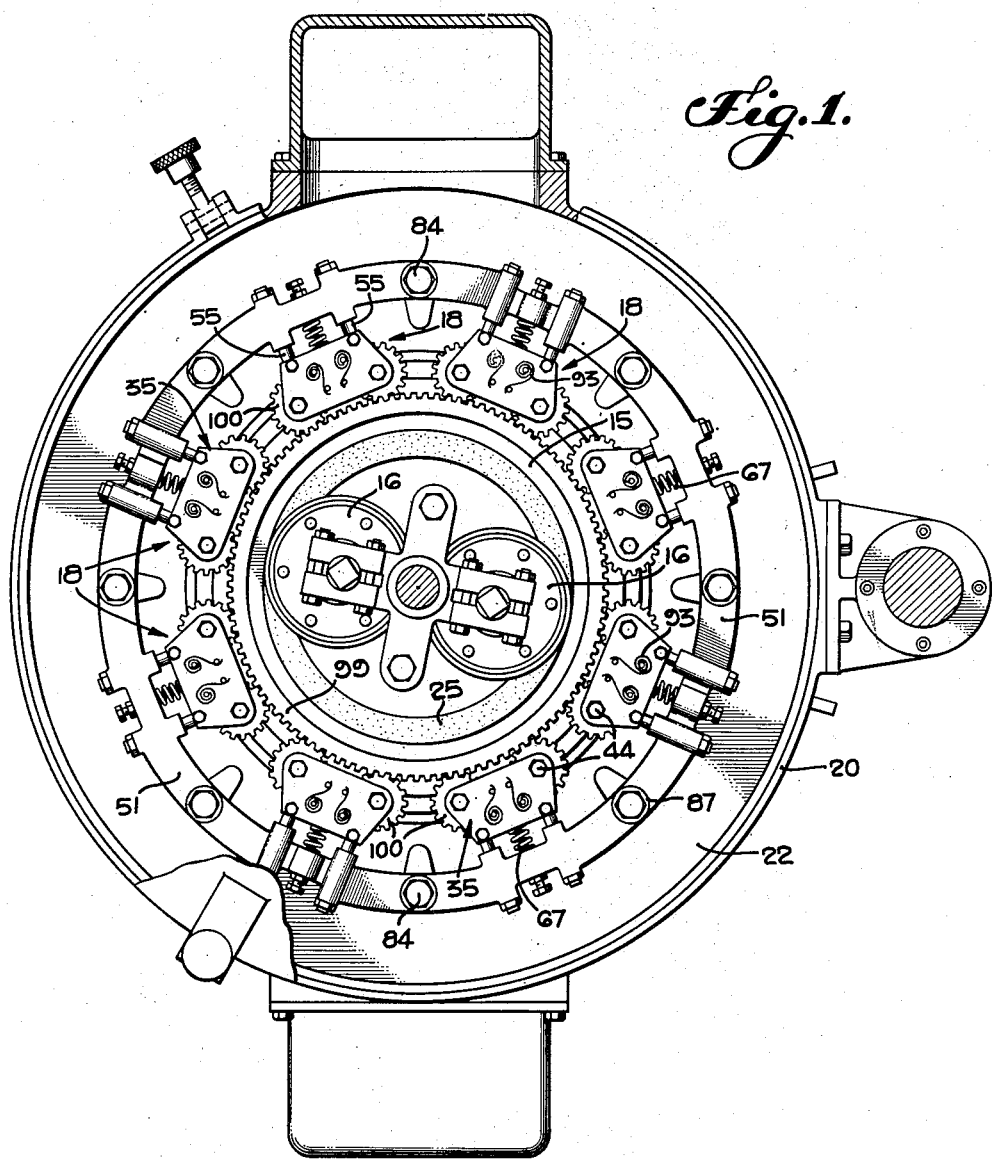
Figure 1 is a plan view partially in section showing an apparatus embodying the present invention.

Referring to the accompanying drawings wherein similar reference characters designate similar parts throughout, Fig. 1 is a view in plan of a crumble apparatus embodying the present invention and comprises an annular extruding die 15 which is stationary and in which there is an extruding unit 16 and a plurality of crumble units 18 are bodily rotated around the stationary annular die 15 for the purpose of crumbling material extruded through the die. There is a housing 20 providing a crumbling chamber between the outer periphery of the annular die 15 and the inner periphery of the housing 20. The construction of the housing and of the extruding rollers 16 and the manner of driving the extruding rollers is the same as disclosed in my above identified Patent No. 2,700,941, and therefore a repetition of the manner of driving the various units and the construction of the housing is not deemed necessary. In my Patent No. 2,700,941, there was an annular conveying and mounting plate which is similar in construction to conveying and mounting plate 22 shown in Fig. 1, and therefore, the method of mounting this plate and the method of driving this plate being shown in my prior application are not deemed necessary to repeat herein.

It is to be understood that as in my prior case, dry feed is fed into the apparatus mixed with steam to produce a moldable mass and the moldable mass is fed into the extruding chamber defined by the inner surface of the annular die 15 and the moldable material 25 shown in Fig. 1 is caused to be extruded through orifices extending from the inner face of the annular die to the outer face thereof by the extruding roller unit 16. The crumble units 18 are for the purpose of assisting in crumbling the moldable material as it issues from the annular die 15.

Figure 2:
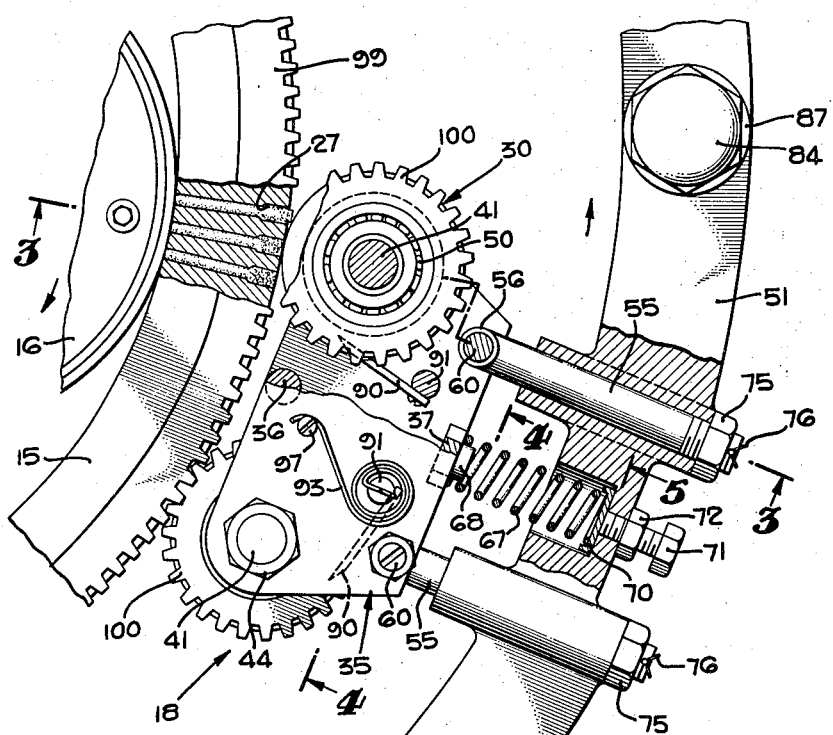
Fig. 2 is a fragmentary sectional view in plan of a portion of the device disclosed in Fig. 1 showing the manner of mounting a crumble unit.
Figure 3:
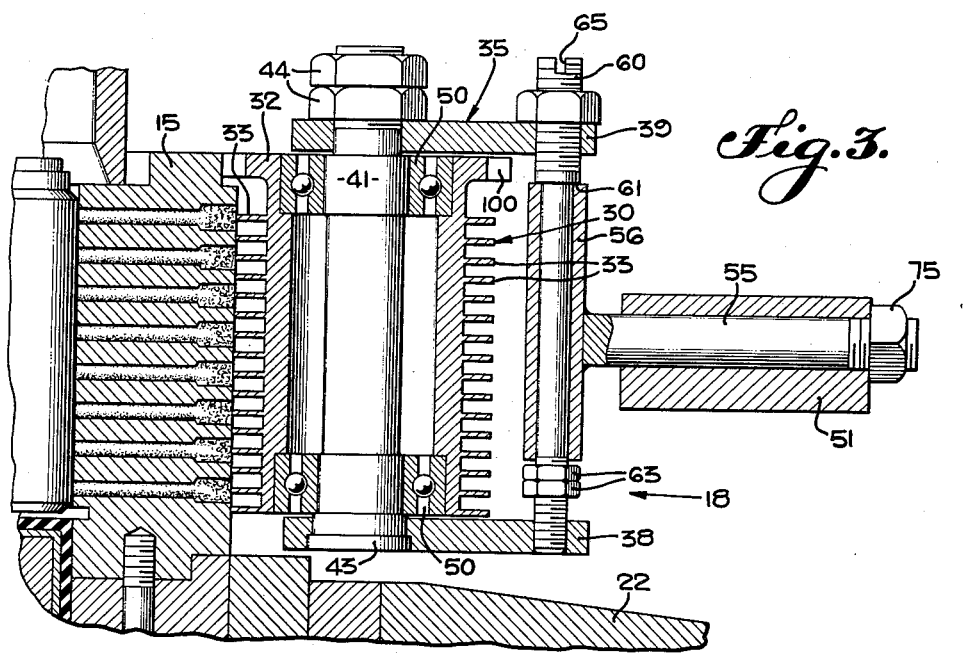
Fig. 3 is a fragmentary sectional view in elevation along line 3—3 of Fig. 2 showing the cooperation between a gang of discs and the extruding die.

An extremely important part of the present invention is in the formation of the extruding orifices and as can be seen from Fig. 2, the extruding orifices have inner portions thereof of substantially the same diameter and then the extruding orifices change in size abruptly at 27 to provide an unsupported portion and in this unsupported portion under ideal conditions, the material issuing from the supported portion of the extruding orifices breaks up and crumbles. However, under usual operating conditions some of the material issuing from the extruding orifices is not crumbled and to provide for a greater percentage of crumbling a plurality of gangs of discs 30 are provided for only partially blocking the outlets of the extruding orifices. Applicant has made a number of tests using different types of rollers and discs and the like and has found that for satisfactory operation it is extremely important that the outlets of the extruding orifices be only partially blocked and that if the outlets are totally blocked, the percentage of crumbles obtained is less. The discs may be formed in any manner, but a preferred form of constructing the gangs of discs is shown in Fig. 3, wherein there is a sleeve 32 having a plurality of annular fins 33 of uniform thickness provided thereabouts, the thickness of the fins being less than the size of the outlets of the extruding orifices as shown in Fig. 3 and the fins are so positioned that they are substantially centered in relation to the outlets of the extruding orifices. The usual method of constructing an annular die is to have staggered extruding orifices and by comparing Figs. 3 and 4, it can be seen that each of the annular fins 33 is centered with regard to a row of outlets of extruding orifices.

Each of the crumble units 18 comprises a cage 35 including spacing posts 36 and 37 and a lower plate 38 and an upper plate 39. There are axles 41 supported in the plates 38 and 39 and secured to the plates by shoulders 43 and lock or jamb nuts 44, see Fig. 3. The gangs 30 which comprise sleeves 32 and annular fins 33 are rotatably supported on axle 41 by bearings 50. Cages 35 are supported by crumble carriers 51 so as to resiliently engage the exterior of the annular die 15 and to be supported for rocking movement to enable the crumble units to ride or rock over waves of extrusions issuing from the die 15. The extruding process is not always uniform. There are times when the extruded material is fairly solid and to avoid any damage the cages 35 are supported for rocking movement on sliding pins 55 having knuckles 56 secured to the inner ends thereof, said sliding pins being slidably received by crumble unit carriers 51 as shown in Figs. 2 and 3. Knuckles 56 pivotally receive knuckle pins 60 which thread into lower plate 38 and upper plate 39 and which are provided with shoulders 61 and jamb nuts 63 as shown in Fig. 3. Knuckle pins 60 are also provided with screwdriver slots 65 so that upon rotation of the knuckle pins the discs which in Fig. 3 are provided by annular fins 33, may be centered with relation to the extruding orifices of the annular die 15.

There are springs 67 for urging the gangs of discs 30 into engagement with the exterior of the annular die 15 and the inner ends of the spring 67 are centered by lugs 68 on posts 37, see Fig. 2, and the outer ends of the springs 67 are recessed in carriers 51 and received by retainers 70 which are adjustably mounted in the carriers by bolts 71 and locknuts 72. During normal operation the crumble units are urged into engagement with the exterior of the die and yet rocking of the crumble units is permitted against the resistance of the springs 67 to permit the crumble units to ride over hard portions of the extrusion. The amount of pressure of the crumble units can be varied by bolts 71 in locknuts 72.

During assembling of the crumble units into the apparatus or removal therefrom nuts 75 on sliding pins 55 are threaded up to hold the crumble units on the carrier during removal or insertion. Cotter pins 76 are provided on the outer ends of sliding pin 55 to prevent accidental loosening and losing of the nut 75 during operation of the machine. Nuts 75 are backed off once the crumble units are arranged against the exterior of the annular die, and therefore are used only during removal or insertion of the crumble units.

Figure 5:
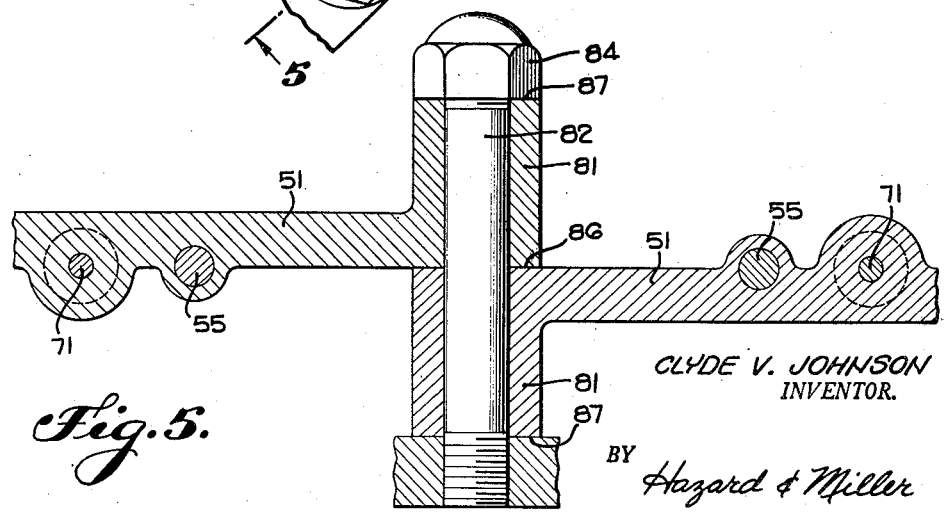
Fig. 5 is a fragmentary sectional view in elevation along lines 5—5 of Fig. 2 showing the construction of the carriers for the crumble units.

The crumble units 18 are supported on carriers 51 as previously mentioned and carriers 51 have spaced apart, post-encircling members 81 which encircle posts 82 which are threaded into conveying and mounting annular plate 22 as shown in Fig. 5. There are cap nuts 84 threaded on posts 82 to retain the carriers on the posts. The sliding pins 55 are supported by the carriers 51 with the center lines thereof in a horizontal plane containing the lower faces 86 of the carriers. The faces 86, whether they are positioned upwardly or downwardly, are considered to be the lower faces as compared to faces 87 which are located atop the encircling members 81. By this construction, each post 82 is a common support for post-encircling members of adjacent carriers and the carriers are alternately arranged up and down around the annular die 15 but all the crumble units are centered in the same horizontal plane as can be seen from Fig. 5, wherein the left-hand sliding pins 55 have their centers in the same plane with right-hand sliding pins 55.

Figure 4:
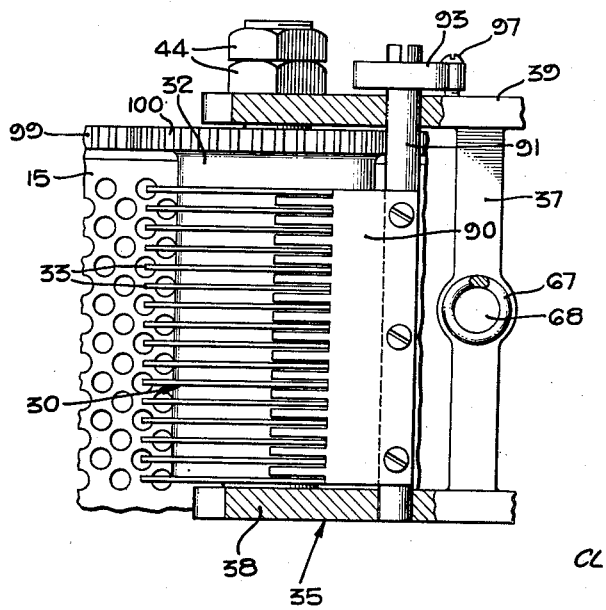
Fig. 4 is a fragmentary sectional view in elevation along lines 4—4 of Fig. 2, showing the manner of cleaning a gang of discs.

Means for cleaning the gangs of discs 30 are shown in Fig. 4 and comprise a cleaning comb 90 fixedly mounted on pivot pins 91 which pivot in upper and lower plates of the cages 35 and these combs are urged into engagement with the sleeves 32 of the gangs of discs by clock springs 93 which are secured at one set of ends to pivot pins 91 and at their other set of ends to the upper plates 39 of cages 35 by screws 97.

There is a tendency for the gangs of discs to slide on the annular die 15 and it is also necessary in order to properly clean the gangs of discs that they be positively rotated. When the gangs of discs merely slide against the exterior of the annular die it has been discovered that the percentage of crumbles is not as great as when the gangs of discs rotate against the outer face of the annular die. Therefore, the annular die is provided with a ring gear 99 which meshes with pinions 100 which, in Fig. 3, are shown as being formed integral with sleeves 32 and therefore, when the crumble units are bodily rotated around the exterior of the annular die 15 that are positively rotated by the engagement of ring gear 99 and pinions 100, and therefore, adequate crumbling of the moldable material is assured and adequate cleaning of the gangs of discs by the combs 90 is assured.

A modified form of the die 105 is shown in Fig. 7, and it is to be seen that the outer unsupported portions of the extruding orifices are angularly arranged with relation to the inner extruding portions of the extruding orifices. The material, when forced through the extruding orifices, strikes the angular faces 107 and it has been discovered that an even more positive breaking up or crumbling of the moldable material is achieved by this arrangement.

A modified form of the gangs of discs is shown in Fig. 6 wherein the fins 110 taper radially inward resulting in a somewhat easier cleaning by the tapered teeth 111 of the combs 112. It has been discovered that these tapered type of fins 110 result in a better crumbling with certain type of feed than with the straight uniform type of fins or discs.

Another modified form of the gangs of discs is shown in Figs. 8 and 9, wherein the peripheries of the fins 115 are notched at 116 and this type of construction results in a better crumbling with certain types of feeds than with the plain, unnotched type of fins or discs.

The form of the invention disclosed in Fig. 1 has a stationary annular die 15 and a bodily rotating extruding unit and bodily rotating crumbling units. The form of the invention disclosed in Figs. 10 and 11 is one wherein the annular die 120 is rotatable through a stem 121 and the extruding rollers 123 are bodily stationary though of course are axially rotated. This type of construction is shown in the Meakin Patent No. 2,240,660, issued May 6, 1941, and therefore a detailed description is not deemed necessary. There is a feed guide 130 and a hopper 131 in which the moldable material is introduced into the extruding chamber defined by the interior of the annular die 120 and the housing member 132. The unit is mounted on a frame 134 and on frame 134 are adjustably mounted carriers 137 similar to the carrier 51 of the form of the invention disclosed in Fig. 1. Carriers 137 have elongated slots 140 therein which receive posts, not shown, and are secured to the post by cap nuts 143 and carriers 137 may be circumferentially adjusted by loosening cap nuts 143 and moving the carriers with relation to the post. There are crumble units 18a carried by carriers 137 and these crumble units rotatably engage the exterior of annular die 120 and are centered with relation to the outlets of the extruding orifices in the annular die 120. The gangs of discs are positively driven by a ring gear and pinion setup as in the form of the invention disclosed in Fig. 1.

In the form of the invention disclosed in Figs. 10 and 11, one gang of discs is positioned approximately opposite an extruding roller 123 so that each of the extruding rollers have gangs of discs positioned approximately opposite thereof. It has been found in operating such a machine that sometimes better operation is obtained when a gang of discs is positioned substantially opposite an extruding roller, but at other times better operation is achieved when the gangs of discs are positioned to somewhat lag in a sense the extruding rollers to account for the time necessary for the extruding material to be forced through the orifices of the annular die. However, by means of the elongated slots 140, a proper adjustment of the gangs of discs with relation to the extruding rollers 123 can be made.

With regard to the form of the invention disclosed in Fig. 1, applicant has discovered than an ideal operating condition results when the crumble units are rotated in what might be termed in synchronous fashion with relation to the extruding rollers 16. For instance, if the extruding rollers are driven at 300 R. P. M. there as six hundred passes around the extruding die 15 per minute. If there are sixteen gangs of discs engaging the exterior of the annular die as they are shown in Fig. 1, a synchronous speed can be obtained by dividing the number of gangs of discs into the number of passes which in this case would result in a driving speed for the gangs of discs of 37½ R. P. M. Therefore, the optimum condition for this particular set of circumstances is for the extruding rollers to be bodily rotated at 300 R. P. M. and the crumble units to be bodily rotated at 37½ R. P. M.

In the second major form of the invention shown in Figs. 10 and 11, there is no necessity for figuring any synchronous speed since the gangs of discs are always positioned in a fixed relation with respect to the extruding rollers within the interior of the annular die.

Various changes may be made in the details of construction without departing from the spirit and scope of the invention as defined by the appended claims.

I claim:

1. In a device of the class described, an annular die having extruding orifices extending from the inner face of the die to the outer face of the die and which orifices increase in size from the inlet face to the outlet face, means for partially blocking the outlets of the orifices for crumbling or breaking the material as it issues from the orifices, last-named means including a gang of discs arranged to rollingly engage the outer face of the die.

2. In a device of the class described, an annular die having extruding orifices extending from the inner face of the die to the outer face of the die and which orifices increase in size from the inlet face to the outlet face, means for partially blocking the outlets of the orifices for crumbling or breaking the material as it issues from the orifices, last-named means including a gang of discs arranged to rollingly engage the outer face of the die, the engaging portions of the discs being narrower than the outlets of the orifices and being approximately centered with respect to the orifices to partially block the outlets and to cause the material issuing from the outlets to be crumbled.

3. In a device of the class described, a die having orifices extending from an inlet side thereof to a material outlet side thereof, means for causing material to be extruded through the die from the inlet side to the outlet side, means providing a plurality of axially rotatable rollers engaging the outer side of the die for partially blocking the outlets of the orifices to cause the extruded material to be crumbled, and means for positively axially rotating the rollers independently of any motion imparted to the rollers by engagement with the die.

4. In a device of the class described, an annular die ring having orifices extending therethrough from its inner face to the outer face thereof, means within the ring for extruding material outwardly through the orifices, the orifices being of substantially uniform size from the inner face toward the outer face, then abruptly increasing in size, and then continuing uniformly of the increased size to the outer face of the ring, that portion of each orifice which is of increased size being arranged at an angle to the remainder of the orifice.

5. In a device of the class described, a die having inner and outer faces and having orifices extending from one face to the other face, means for extruding moldable material through the die from one face to the other, said orifices being of substantially uniform size from one face toward the other, then abruptly increasing in size, and then continuing of uniform increased size to the other side of the die, and means providing blades in substantially flat planes extending across the orifices with their planes parallel to the longitudinal axes of the orifices for dividing and retarding the extruded material without completely arresting its extrusion.

6. In a device of the class described, a die having inner and outer faces and having orifices extending from one face to the other face, means for extruding moldable material through the die from one face to the other, said orifices being of substantially uniform size from one face toward the other, then abruptly increasing in size, and then continuing of uniform increased size to the other side of the die, and means providing blades extending across the orifices with their planes parallel to the axes of the orifices for dividing and retarding the extruded material without completely arresting its extrusion while said means are in a rollingly engaging relationship with said other face of the die.

7. In a device of the class described, a rotary die ring having orifices therethrough from its inner face to its outer face, means for rotating the ring, means within the ring for extruding material outwardly through the orifices, and a series of circular blades rollingly engaging the exterior of the die ring arranged to traverse the outer ends of the orifices as the die ring rotates, the outer ends of the orifices being enlarged with respect to the inner ends of the orifices providing chambers in which the blades may temporarily crush the extruded material.

8. In a device of the class described, a rotary die ring having orifices therethrough from its inner face to its outer face, means for rotating the ring, means within the ring for extruding material outwardly through the orifices, a series of circular blades rollingly engaging the exterior of the die ring arranged to traverse the outer ends of the orifices as the die ring rotates, and means for positively rotating said blades.

9. In a device of the class described, a rotary die ring having orifices therethrough from its inner face to its outer face, means for rotating the ring, means within the ring for extruding material outwardly through the orifices, a series of circular blades rollingly engaging the exterior of the die ring arranged to traverse the outer ends of the orifices as the die ring rotates, and means driven off of the die ring for positively rotating said blades.

10. In a machine of the class described, a die having orifices therethrough, means for extruding material through the orifices, and a plurality of circular rotary blades each of which is narrower than the outlet end of the orifices, means yieldably urging the blades against the outer side of the die, and means for rolling the blades relatively to the outer side of the die so as to traverse the orifices therein.

11. In a machine of the class described, a die having orifices therethrough, means for extruding material through the orifices, a plurality of circular rotary blades each of which is narrower than the outlet end of the orifices, means yieldably urging the blades against the outer side of the die, and means for rolling the blades relatively to the outer side of the die so as to traverse the orifices therein, the outer ends of the orifices being enlarged to form chambers in which the extruded material may be crushed by the blades.

References Cited in the file of this patent

UNITED STATES PATENTS

| | | |
|---|---|---|
| 1,738,361 | De Vito | Dec. 3, 1929 |
| 1,862,947 | Smith et al. | June 14, 1932 |
| 2,059,486 | Payne et al. | Nov. 3, 1936 |
| 2,060,236 | Muehl | Nov. 10, 1936 |
| 2,063,404 | Selman | Dec. 8, 1936 |
| 2,157,528 | Crabtree | May 9, 1939 |
| 2,167,900 | Meakin | Aug. 1, 1939 |
| 2,174,141 | Sizer | Sept. 26, 1939 |
| 2,252,900 | Shafer | Aug. 19, 1941 |

FOREIGN PATENTS

| | | |
|---|---|---|
| 251,324 | Great Britain | Apr. 26, 1926 |